Jan. 19, 1960    F. SCRAGG ET AL    2,921,430
SPINDLE DRIVE ARRANGEMENT

Filed May 28, 1958    3 Sheets-Sheet 1

— FIG. 1 —

INVENTORS
FREDERICK SCRAGG
PHILIP FORWARD
BY MEAD, BROWNE,
SCHUYLER & BEVERIDGE
ATTORNEYS

Jan. 19, 1960  F. SCRAGG ET AL  2,921,430
SPINDLE DRIVE ARRANGEMENT

Filed May 28, 1958  3 Sheets-Sheet 2

—FIG. 2.—

INVENTORS
FREDERICK SCRAGG
PHILIP FORWARD
BY
MEAD, BROWNE,
SCHUYLER & BEVERIDGE
ATTORNEYS

Jan. 19, 1960  F. SCRAGG ET AL  2,921,430
SPINDLE DRIVE ARRANGEMENT
Filed May 28, 1958  3 Sheets-Sheet 3

INVENTORS
FREDERICK SCRAGG
PHILIP FORWARD
BY
MEAD, BROWNE,
SCHUYLER & BEVERIDGE
ATTORNEYS

United States Patent Office 2,921,430
Patented Jan. 19, 1960

2,921,430

SPINDLE DRIVE ARRANGEMENT

Frederick Scragg, Tytherington, Macclesfield, and Philip Forward, Macclesfield, England, assignors to Sydney & E. Scragg Limited, Macclesfield, England, a British company Application May 28, 1958, Serial No. 738,534

Claims priority, application Great Britain May 29, 1957

3 Claims. (Cl. 57—88)

The present invention concerns ring spinning, doubling and twisting machines and more especially ring doublers.

In order to avoid the need for stopping all the spindles on a ring doubling machine for doffing, individually controllable spindle drive arrangements are used. Each spindle is displaceable with its wharve towards or away from the common driving belt to connect or disconnect the drive as the case may be. Movement of the ring and traveller with the spindle is not practicable, and in consequence the spindle must be displaced relatively to the ring during such drive control movements. Hence in the driven condition of the spindle it may run eccentrically in the ring with the result that uneven winding may occur.

An object of the present invention is to provide an arrangement in which the aforementioned disadvantage is avoided.

The invention broadly consists in mounting each spindle in a fixed position coaxially within its ring and providing a displaceable belt engaging wharve for causing the drive to be transmitted directly and/or indirectly from the driving belt.

According to one aspect of the present invention, in a ring spinning, doubling or twisting machine, each spindle is rotatably mounted in a fixed position coaxially within its ring and a wharve mounted on an arm swingable about the spindle axis is adapted to effect engagement of the drive by pressing the driving belt against a driving wharve mounted coaxially with and fixed to the spindle.

According to another aspect of the present invention, in a ring spinning, doubling or twisting machine, each spindle is rotatably mounted in a fixed position coaxially within its ring and has an external pinion engaging a pinion fixed to a driving wharve mounted on an arm swingable about the spindle axis to effect engagement or disengagement of the drive.

In a preferred form of construction of a ring spinning, doubling or twisting machine in accordance with the invention, each spindle is rotatably mounted in a fixed position coaxially within its ring and has a main driving wharve mounted coaxially therewith and an external pinion engaging a pinion fixed to a secondary driving wharve mounted on an arm swingable about the spindle axis and being adapted to guide the driving belt into engagement with both main and secondary driving wharves.

The invention will be described further, by way of example, with reference to the accompanying drawings, in which.

Figure 1:
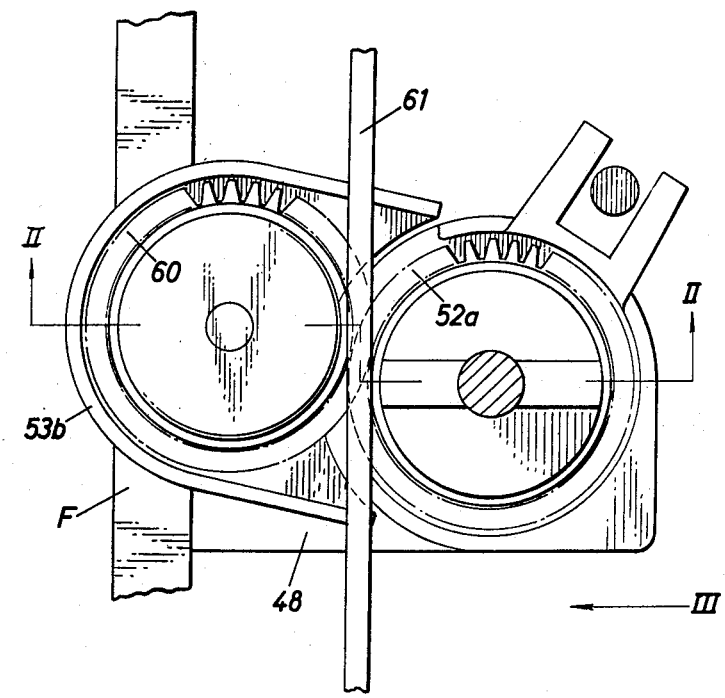
Fig. 1 is a part plan, part sectional elevation of a preferred form of doubler constructed in accordance with the invention.
Figure 2:
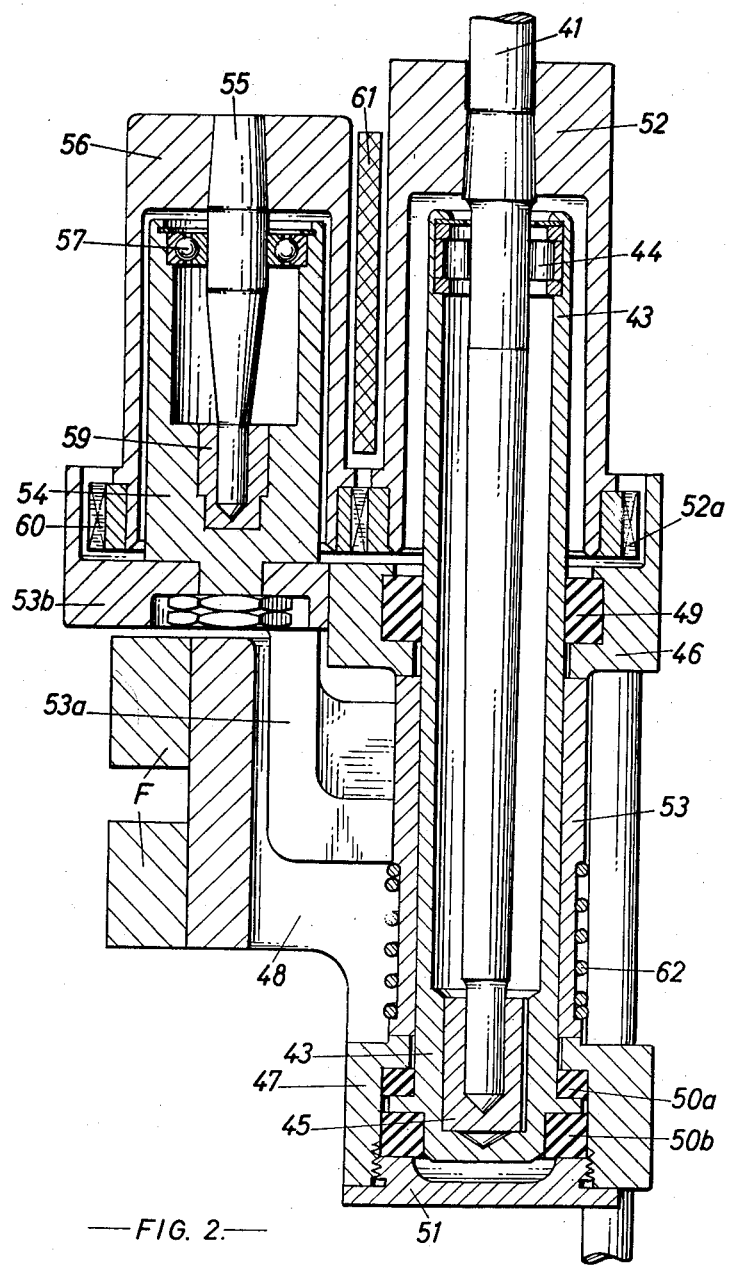
Fig. 2 is a section taken generally on the line II—II of Fig. 1.
Figure 3:
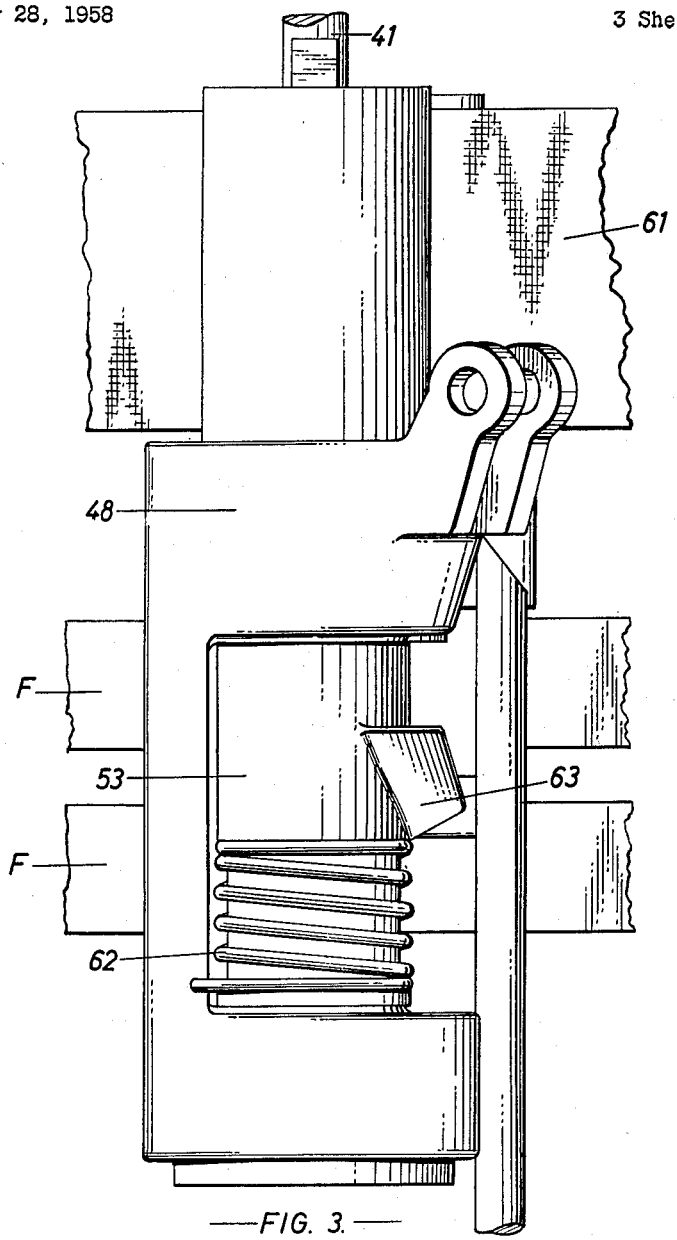
Fig. 3 is an elevation of the spindle unit viewed in the direction of the arrow III of Fig. 1.

In a ring doubling machine, each spindle 41 carries a bobbin (not shown) and is rotatably mounted in bearings arranged within a sleeve 43. These bearings comprise a roller bearing 44, secured within the upper end of the sleeve 43 and a bearing block 45 disposed at the lower end of the sleeve 43 for supporting the lower end of the spindle 41.

The sleeve 43 is disposed in two fixed housings 46 and 47, supported by a main body casting 48 by which latter the assembly is attached to a machine frame F. Packings 49, 50a and 50b, arranged in the fixed housings 46 and 47 respectively, are adapted to prevent rotation of the sleeve 43; the lower end of the fixed housing 47 is fitted with a closure cap 51.

The upper end of a cylindrical member 52, constituting a primary driving wharve, is fixed to the spindle 41 while its tower outer surface is splined to form gear teeth 52a. Driving dogs or other suitable driving means (not shown) are provided at the top of the cylindrical member 52 and engage the bobbin (not shown).

A sleeve 53, pivotable about the sleeve 43, is mounted between the two fixed housings 46 and 47. A swing arm 53a, integral with the sleeve 53 carries a gear casing 53b at its upper end. The sleeve 43 is adapted to pass through a bore in the casing 53b, which casing carries a bearing block 54 adapted to support bearings for a spindle 55 upon which a secondary driving wharve 56 is mounted.

The bearings for the spindle 55 comprise ball bearings 57 and a bearing block 59 for supporting its lower end.

An external gear ring 60 is rigidly attached to the lower end of wharve 56 and is adapted to cooperate with the gear teeth 52a splined on the cylindrical member 52, the gear ratio between the cylindrical member 52 and the wharve 56 being such that the peripheral speed of the wharve 56 is equal to that of the cylindrical member 52.

The drive for the whole assembly is taken from a machine driving belt 61, which passes between and makes contact with the cylindrical member 52 and the wharve 56, the drive from the wharve 56 being transmitted to the cylindrical member 52 through the gear ring 60 and gear 52a.

To keep the secondary driving wharve 56 in the inoperative position shown in the drawings, a cam (not shown) bears on an inclined surface 63 of the sleeve 53. To bring the wharve 56 into the driving position this cam is removed and the wharve 56 urged against the belt 61 under the action of a torsion spring 62; the drive to the assembly can be discontinued by swinging the wharve 56 away from the driving belt 61 against the action of the spring and replacing the cam.

We claim:

1. In a machine of a kind selected from the group composed of ring spinning machines, ring doubling machines and ring twisting machines, a machine frame, a plurality of rings mounted with their axes fixed relative to said frame, a spindle associated with each ring, each spindle being rotatably mounted about an axis fixed relative to said frame and coincident with the axis of its corresponding ring, a driving belt supported from the frame, a driving wharve for each spindle mounted for rotation and displaceable into and out of engagement with the belt, and gearing means for each spindle for transmitting drive from the wharve to the spindle irrespective of the position of the wharve.

2. In a machine of a kind selected from the group composed of ring spinning machines, ring doubling machines and ring twisting machines, a machine frame, a plurality of rings mounted with their axes fixed relative to said frame, a spindle associated with each ring, each spindle being rotatably mounted about an axis fixed relative to said frame and coincident with the axis of its corresponding ring, an externally toothed pinion mounted coaxially with and fixed to each spindle, an arm mounted swingably about the axis of rotation of each spindle, a driving wharve mounted for rotation on each arm, another externally toothed pinion mounted coaxially with and fixed to each driving wharve and meshing with the first mentioned pinion, a driving belt supported from the frame, and means for maintaining each driving wharve in engagement with the belt.

3. In a machine of a kind selected from the group composed of ring spinning machines, ring doubling machines and ring twisting machines, a machine frame, a plurality of rings mounted with their axes fixed relative to said frame, a spindle associated with each ring, each spindle being rotatably mounted about an axis fixed relative to said frame and coincident with the axis of its corresponding ring, a main driving wharve and an externally toothed pinion both mounted coaxially with and fixed to each spindle, an arm mounted swingably about the axis of rotation of each spindle, a secondary driving wharve mounted for rotation on each arm, another externally toothed pinion mounted coaxially with and fixed to each secondary driving wharve and meshing with the first mentioned pinion, a driving belt supported from the frame and passing between the main driving wharves and the secondary driving wharves, and means for maintaining each arm individually displaced in the direction towards the belt whereby to urge the belt into driving engagement with the main driving wharve.

References Cited in the file of this patent

UNITED STATES PATENTS

| | | |
|---|---|---|
| 725,053 | Duffy | Apr. 14, 1903 |
| 2,883,824 | Andrews et al. | Apr. 28, 1959 |

FOREIGN PATENTS

| | | |
|---|---|---|
| 313,585 | Great Britain | Jan. 24, 1930 |